United States Patent [19]
Schubert

[11] Patent Number: 5,865,061
[45] Date of Patent: Feb. 2, 1999

[54] LINEAR DRIVE MECHANISM INCLUDING A CABLE

[75] Inventor: Peter Schubert, Gaggenau, Germany

[73] Assignee: Precitez GmbH, Bad Rotenfels, Germany

[21] Appl. No.: 867,799

[22] Filed: Jun. 3, 1997

[30] Foreign Application Priority Data

Jun. 4, 1996 [DE] Germany .................. 196 22 413.6

[51] Int. Cl.[6] .................................................. F16H 19/06
[52] U.S. Cl. ........................................ 74/89.22; 74/500.5
[58] Field of Search ................................. 74/89.22, 89.2, 74/89.15; 384/42; 108/143; 248/657

[56] References Cited

U.S. PATENT DOCUMENTS

| | | | |
|---|---|---|---|
| 927,695 | 7/1909 | Stake ......................................... 451/314 |
| 2,839,294 | 6/1958 | McNinch ................................. 74/89.22 |
| 3,025,647 | 3/1962 | Moody ............................... 74/89.22 X |
| 3,709,049 | 1/1973 | Gerauer ..................................... 74/89.2 |
| 4,366,722 | 1/1983 | Hasler . |
| 4,957,014 | 9/1990 | Burke ....................................... 74/89.22 |
| 4,998,442 | 3/1991 | Brown et al. ........................... 74/89.17 |
| 5,531,557 | 7/1996 | Springer .............................. 74/89.15 X |

FOREIGN PATENT DOCUMENTS

| 672844 | 3/1995 | European Pat. Off. . |
| 2431881 | 1/1976 | Germany . |
| 2088987 | 6/1982 | United Kingdom . |

*Primary Examiner*—Rodney H. Bonck
*Assistant Examiner*—William C. Joyce
*Attorney, Agent, or Firm*—Laubscher & Laubscher

[57] ABSTRACT

A linear drive mechanism includes a cable wound on a motor-driven cable drum for accurately displacing a driven member in a linear direction relative to a housing, the driven member being adapted to carry the connecting head of a laser processing system, or the like. The ends of the cable are connected with the driven member and with the housing, respectively, the cable being tensioned to frictionally retain the cable turns on the cable drum, and to effect accurate positioning of the driven member with a low wear rate and without play or backlash.

11 Claims, 3 Drawing Sheets

LINEAR DRIVE MECHANISM INCLUDING A CABLE

SPECIFICATION

BACKGROUND OF THE INVENTION

1. Field of the Invention

This invention relates to a linear drive mechanism for accurately driving a driven member, such as a holder for the operating head of a laser processing system, in a given linear direction, characterized by the use of motor-driven cable means for connecting the driven member relative to a housing within which it is slidably mounted.

2. Brief Description of the Prior Art

Various types of linear drive mechanisms have been proposed in the prior art for converting rotary motion of an object—such as the output shaft of an electric hydraulic or pneumatic motor—to linear motion for driving a member in a given linear direction. Previously it has been proposed to use threaded spindles or pinion-gear and rack arrangements to effect the desired rotary to linear conversion, which arrangements possess the drawback of having moving parts that move against one another, thereby resulting in undesirable wear of the components. Furthermore, manufacturing tolerances must be taken into account, thereby affecting the accuracy of the linear displacement of the driven member.

It has been proposed in the patented prior art to utilize flexible cables or bands for connecting a rotary driving member with a linearly displaceable driven member, as shown, for example, by the Hasler U.S. Pat. No. 4,366,722, the Blount British patent No. 2,088,987, the Kolb German Off. No. 2,431,881, and the Jakob European application No. 672,844.

The present invention was developed to provide an improved linear drive mechanism that is particularly suitable for accurately driving a driven member—such as the holder for the connection head of a laser processing system—in a linear direction relative to a housing within which it is mounted.

SUMMARY OF THE INVENTION

Accordingly, a primary object of the present invention is to provide a linear drive mechanism for driving a driven member that is slidably mounted within a housing by a motor mounted on the housing, use being made of a cable having an intermediate portion wound on a cable drum, and a pair of tensioned cable ends connected with opposite ends of the driven member, respectively.

When the cable drum is rotated in opposite directions, the driven member is correspondingly reciprocated linearly within its housing owing to the frictional engagement of the tensioned cable intermediate portion and the periphery of the cable drum upon which it is wound. The drive operates virtually without wear, since the cable is simply wound onto and off of the cable drum. Consequently, manufacturing tolerances in the region of the cable and the cable drum have no disadvantageous effect on the accuracy of the linear drive of the driven member.

Since the cable is tensioned directly between the ends of the driven member, no further driving or deflecting means are required opposite the ends of the driven member, thereby permitting the overall length of the driven member to be reduced, and without obstructing the ends of the driven member. The displacement path of the driven member is limited only by the laterally arranged cable drum, but this does not result and any further problem in the case of linear drives having a short operating stroke.

According to a more specific object of the invention, the drive cable is wound around a cable drum having on its outer periphery a continuous helical groove for receiving the cable turns, thereby to prevent the cable from rubbing against itself during rotation of the cable drum.

According to another object of the invention, in order to effect accurate positioning of the drive member with the use of little power, the drive motor is connected with the cable drum via conventional gear reduction means. In this case, an electric motor that is mounted on the housing is used to drive the cable drum. Preferably, the motor is connected with the reduction gear means via a toothed pulley belt arrangement.

According to a more specific object of the invention, the housing and the driven member are each of a cylindrical configuration, the driven member being concentrically arranged coaxially within the housing. In this manner, a compact construction is achieved which is particularly suitable for the accurate linear displacement of the connection head of a laser processing device. In this case, the connection head is mounted within the linearly driven member. As is known in the art, this connection head of the laser system can contain the optical system for focusing a laser beam that transverses it to be directed on the radiation output side to a distance measuring electrode, or the like.

In accordance with a preferred embodiment of the invention, the driven member has a generally squirrel-cage configuration including a pair of parallel spaced annular end rings that are connected by a plurality of parallel longitudinally extending connecting rods, the driven member being connected for axial sliding movement concentrically within the longitudinal bore of a cylindrical housing. Preferably the driven member is guided for longitudinal sliding movement relative to the housing by a plurality of guide sleeves that are secured with the housing and that slidably receive the connecting rods, respectively.

As a consequence of the invention, a linear drive is provided having, on the one hand, a relatively low mass and yet, on the other hand, affords a simple manner for tensioning the cable either in the region between the end rings, or slightly to the side thereof, thereby further leading to an improved compactness of the complete linear drive.

According to a more specific object of the invention, the cable tensioning means comprises a bushing connected with one end of the cable for threaded cooperation with a tension adjusting screw arranged on the associated one of the end rings. The tensioning of the cable can thus be performed initially, and after a significant amount of operating time, the cable tension can be readily readjusted as desired, thereby assuring that the appropriate predetermined frictional force is achieved between the cable and the cable drum. If desired, a clamping device may be provided for maintaining the turns of the cable in frictional engagement with the grooves of the cable drum, thereby to positively prevent slipping of the cable relative to the drum.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
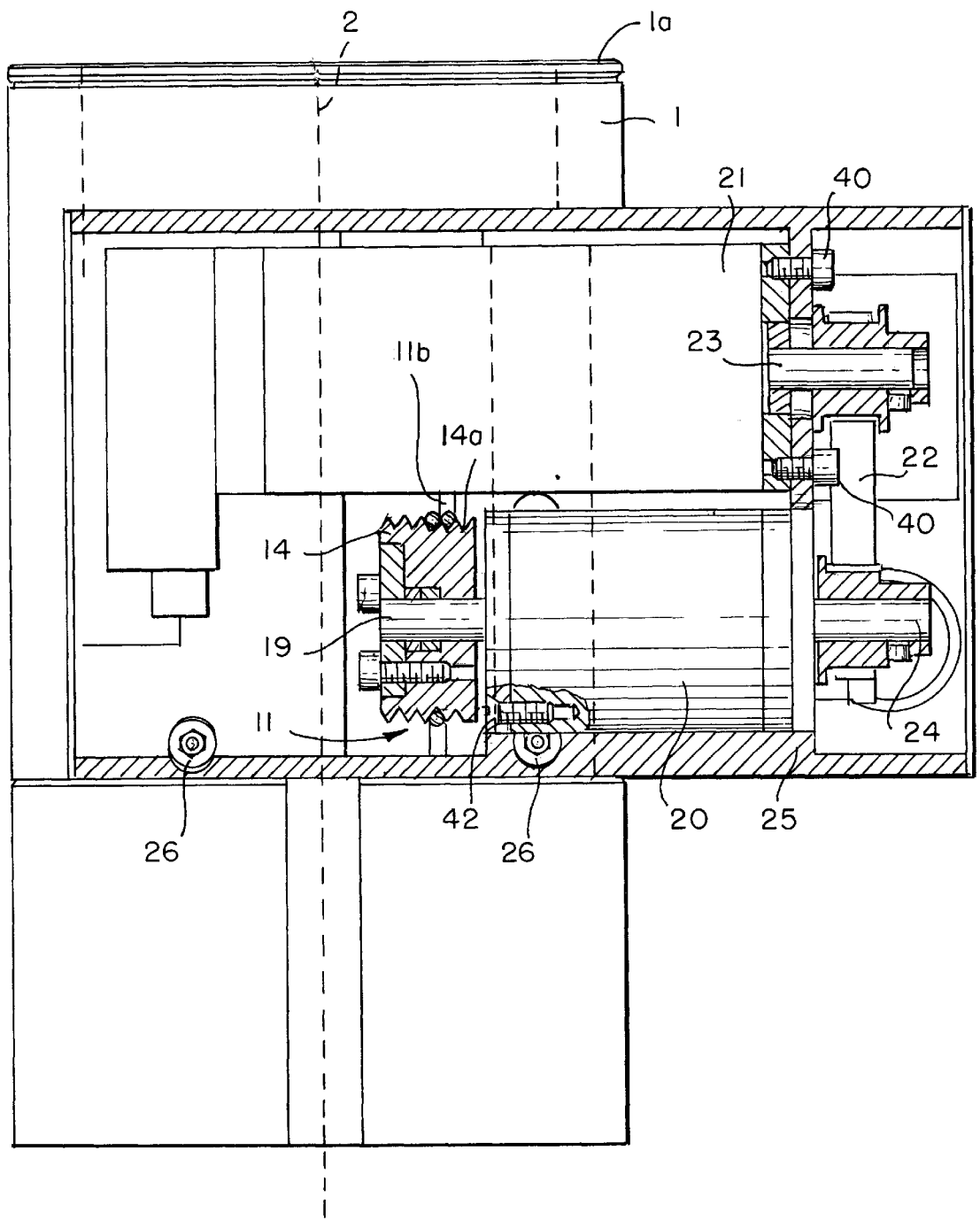
FIG. 1 is a partly sectioned side elevational view of the linear drive apparatus of the present invention taken along line 1—1 of FIG. 2.

Referring now to the drawings, the linear drive apparatus of the present invention includes a hollow cylindrical main housing I having a longitudional axis 2 within which is concentrically mounted for longitudional displacement a driven member 3 (FIG. 2) of generally squirrel-cage configuration. The driven member 3 includes a pair of end rings 4 and 5 that are connected by a plurality of parallel longitudinally-extending connecting rods guide 6. In the illustrated embodiment, three of the longitudional rods 6 are provided in circumferentially spaced relation. The guide rods 6 project into corresponding recesses 7 contained in the end rings, and are fastened in place relative to the end rings by means of the radially-extending set screws 8.

The longitudional guide rods 6 are slidably supported within a plurality of guide sleeves 9, respectively, that are secured in circumferentially spaced relation on the inner wall surface of the main housing member 1. Preferably, an intermediate tubular layer 10 of suitable synthetic plastic material is provided for further guiding and facilitating reciprocatory movement of the guide rods 6 relative to the guide sleeves 9. The length of the guide sleeves 9 is such as to permit the appropriate stroke of reciprocatory motion of the driven member 3 relative to the housing 1. Thus, the linear displacement of the driven member 3 relative to the housing 1 is performed substantially without play.

In accordance with a characterizing feature of the present invention, a flexible cable 11 formed of braided steel or the like has an intermediate portion of 11a wound around a cable drum 14, and a pair of end sections 11b and 11c that are connected with the end rings 4 and 5, respectively. More particularly, the cable end 11b has a lug 12 rigidly clinched thereto, which lug is received in a corresponding tapered recess contained in the upper end face of the end ring 4, a radically extending slot 13 being provided for lateral insertion of the cable through the ring 4, and seating of the lug 12 within the recess contained in the upper face of the ring 4.

Figure 2:
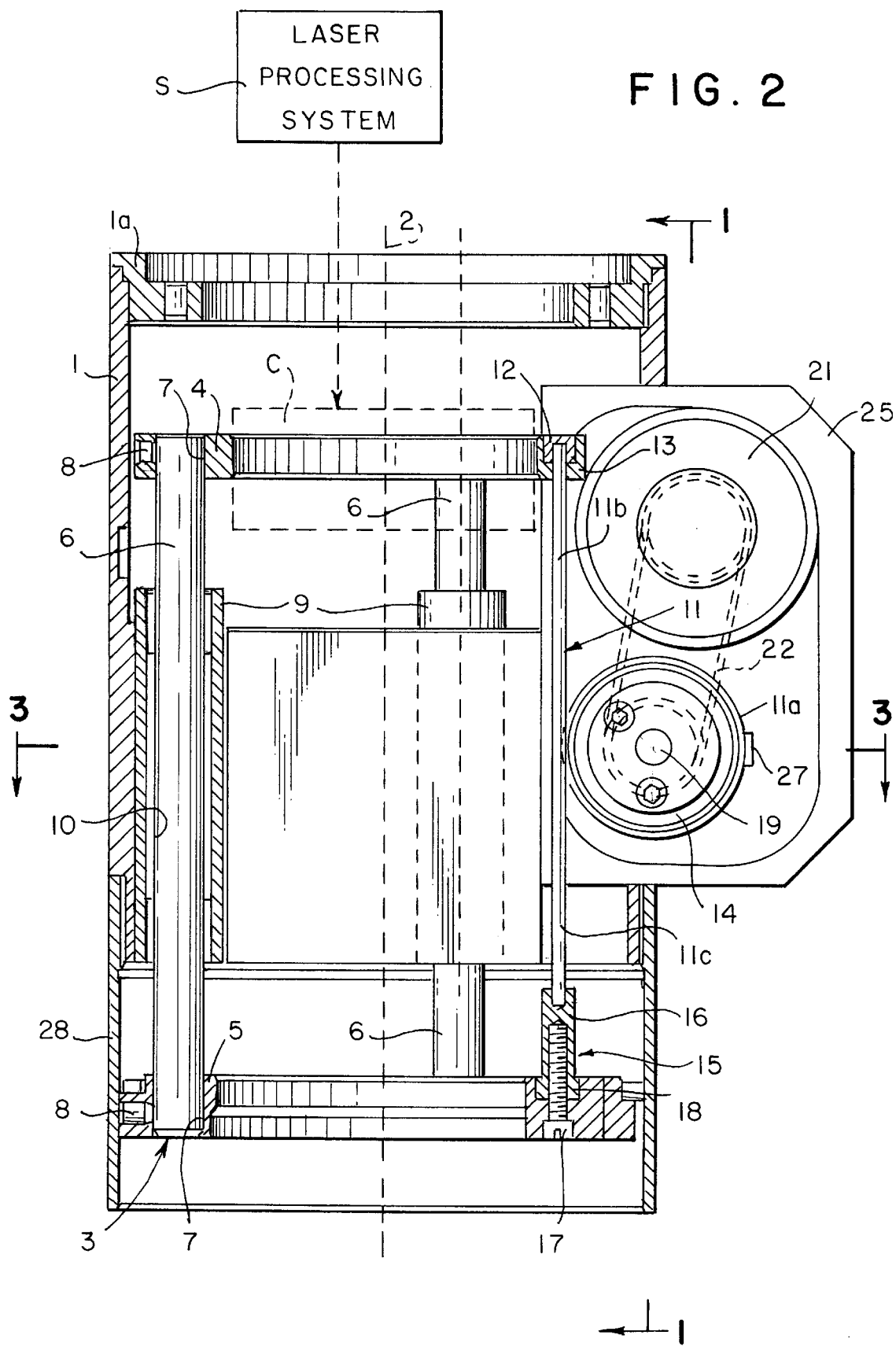
FIG. 2 is an elevational view taken from the right hand side of FIG. 1.
Figure 3:
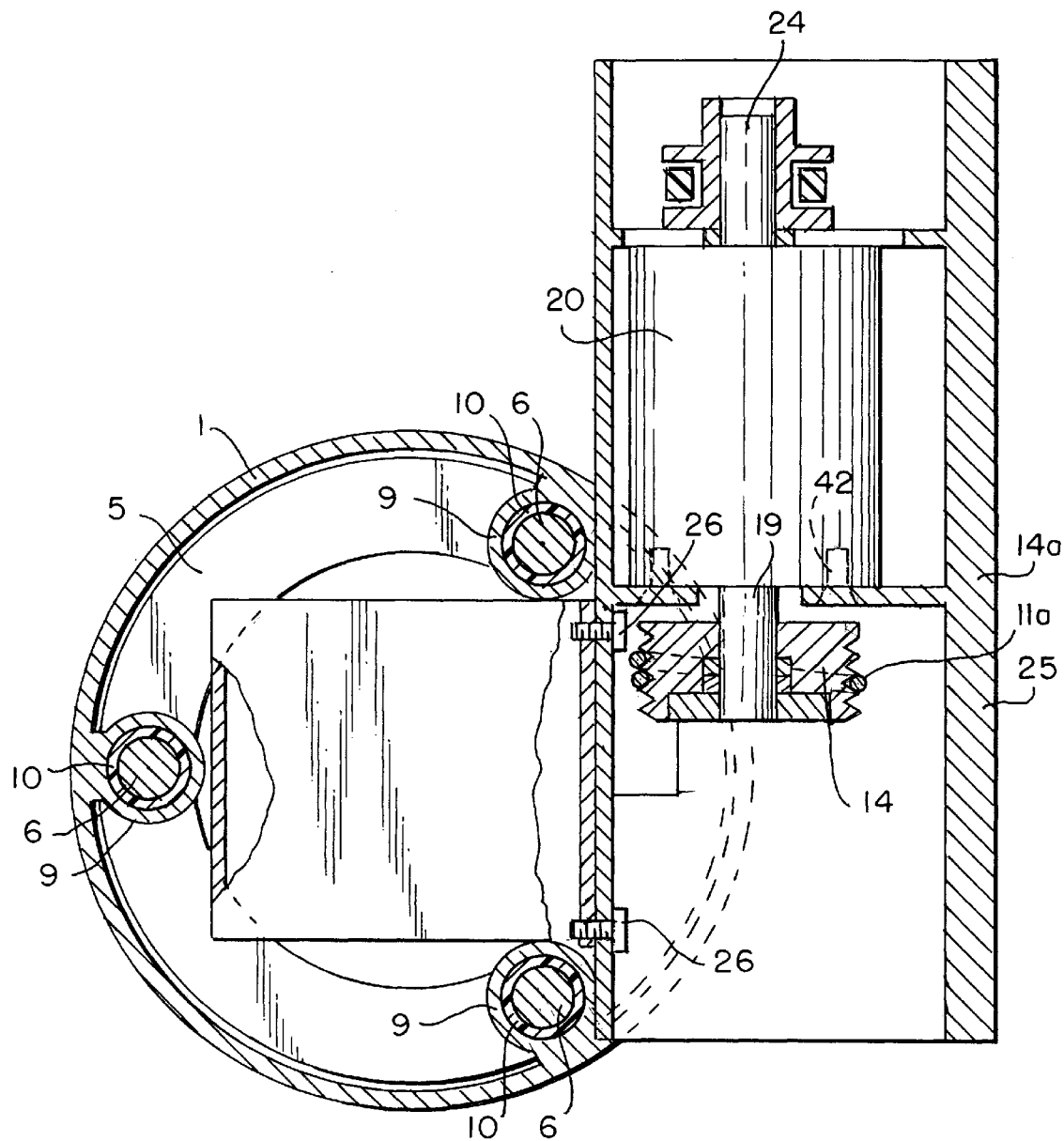
FIG. 3 is a sectional view taken along line 3—3 of FIG. 2.

The intermediate portion 11 a of the cable is contained within a helical continuous groove 14a formed in the outer peripheral surface of the cable drum, as best shown in FIGS. 1 and 3. The cable 11 is tensioned by cable tension means 15 that connect the other cable end 11c with the end ring 5. More particularly, as best shown in FIG. 2, the cable tension means includes a cylindrical bushing 16 that is secured, for example, by clinching, to the cable end 11c, the bushing 16 being internally threaded for connection with an adjustment screw 17 that extends upwardly through the ring 5 and through the recess 18 that contains the lower end of the cylindrical bushing 16. Upon rotation of the tension screw 17, the bushing 16 is displaced downwardly toward the bottom of the recess 18 contained in the upper face of the lower ring 5, thereby resulting in tensioning of the cable 11.

The cable drum 14 is secured to the output shaft 19 of conventional reduction gearing means 20 that are driven by the output shaft 23 of the electric motor 21 via toothed endless belt 22 and corresponding pulley means connected with the motor output shaft 23 and the input shaft 24 of the reduction gearing means 20, respectively.. The motor 21 is bolted by means of bolts 40 to an intermediate transverse wall portion of the drive housing 25, which housing is bolted to an internal wall of the main housing 1 by means of bolts 26, as shown in FIGS. 1 and 3. Similarly, the reduction gear means 20 is bolted to an intermediate wall of the housing 25 by means of bolts 42.

In order to prevent the cable 11 from slipping relative to the cable drum 14, a clamping screw 27 is provided that extends radially into the periphery of the cable drum 14, thereby to fasten the cable 11 to the drum by means of the head portion of the clamping screw 27. This clamping means is desirable in the case of a connection head C (FIG. 2) having a relatively large mass which is to be moved relative to the laser processing systems. In the case of the small mass, frictional force between the cable 11 and the cable 14 is generally sufficient to effect positioning of the driven member without play relative to the housing.

A protective cap 1a is screwed upon the upper end of the housing 1, and a lower protective sleeve 28 is screwed onto the lower end of the main housing portion 1.

In operation, it will be seen that upon rotation of the electric motor 21, the input shaft 24 of the gear reduction means 20 is rotatably driven by the endless belt 22, whereupon the cable drum 14 is rotated in a direction to effect corresponding linear displacement of the squirrel-cage driven member 3. Rotation of the electric motor 21 in the opposite direction is produced by conventional reversing switch means (not shown), whereby motor shaft 23 and input shaft 24 of the reduction gearing means are driven in the opposite direction, thereby producing linear motion of the driven member 3 in the opposite direction.

While in accordance with the provisions of the Patent Statutes the preferred forms and embodiments of the invention have been illustrated and described, it will be apparent to those skilled in the art that changes and modifications may be made without deviating from the inventive concepts set forth above.

What is claimed is:

1. Linear drive apparatus for linearly displacing a driven member relative to a housing, comprising:
   (a) a cylindrical housing (1) containing a longitudinal chamber having a longitudinal axis (2);
   (b) a cylindrical driven member (3) arranged concentrically within said chamber, said driven member including:
      (1) a pair of longitudinally spaced annular end rings (4,5) each contained in a plane extending normal to said longitudinal axis; and
      (2) a plurality of a parallel longitudinally-extending guide rods (6) connected between said end rings;
   (c) guide means on said housing connecting said driven member for longitudinal displacement within said housing chamber, said guide means including a plurality of fixed parallel guide sleeves connected with said housing and extending within said chamber for slidably receiving said guide rods, respectively; and
   (d) drive means for driving said driven member longitudinally relative to said housing, said drive means including:
      (1) a cable drum (14) rotatably connected with said housing for rotation about an axis contained in a plane that is normal to said housing longitudinal axis;
      (2) a flexible cable (11) having an intermediate portion wound about said cable drum, and a pair of cable end portions connected with said driven member end rings, respectively; and
      (3) means (20, 21) for rotatably driving said cable drum, thereby to linearly displace said driven member relative to said housing.

2. Apparatus as defined in claim 1, wherein said cable drum (14) contains on its periphery a continuous helical groove (14*a*) for receiving and guiding said cable intermediate portion.

3. Apparatus as defined in claim 1, wherein said drive means includes a motor (21), and reduction gear means (20) connecting said motor with said cable drum.

4. Apparatus as defined in claim 3, wherein said motor is mounted on said housing.

5. Apparatus as defined in claim 1, wherein said cable drum is arranged between said end rings, said cable being tensioned between said end rings.

6. Apparatus as defined in claim 1, and further including means (15) for adjusting the tension of the cable between said end rings.

7. Apparatus as defined in claim 6, wherein said tension adjusting means includes:

(1) an internally-threaded bushing (16) connected with one end of said cable; and (2) a tensioning screw (17) rotatably connected with the associated end ring, said screw being threadably connected with said bushing.

8. Apparatus as defined in claim 1, and further including clamping means (27) for clamping said intermediate cable portion to said cable drum.

9. Apparatus as defined in claim 1, and further including a connecting head (C) for a laser processing system (S) connected with said driven member.

10. Apparatus as defined in claim 1, wherein said housing includes at one end a removable threadably connected annular protective end cap portion (1*a*).

11. Apparatus as defined in claim 10, wherein said housing includes at its other end a cylindrical protective sleeve portion (28).

* * * * *

UNITED STATES PATENT AND TRADEMARK OFFICE
CERTIFICATE OF CORRECTION

PATENT NO. : 5,865,061
DATED      : February 2, 1999
INVENTOR(S): Peter Schubert It is certified that error appears in the above-indentified patent and that said Letters Patent is hereby corrected as shown below:

Title page, item [73], should read:

Assignee: Precitec GmbH,

Gaggenau-Bad Rotenfels, Germany

Signed and Sealed this

Twenty-eighth Day of September, 1999

Attest:

Q. TODD DICKINSON

*Attesting Officer*     *Acting Commissioner of Patents and Trademarks*